United States Patent [19]

Hansen et al.

[11] Patent Number: 5,532,979
[45] Date of Patent: Jul. 2, 1996

[54] TOWED ARRAY STRAIN-SENSING NOISE CANCELLER

[75] Inventors: Robert J. Hansen, Clinton, Md.; Chen C. Ni, McLean, Va.; Hugh M. Fitzpatrick, Chevy Chase, Md.

[73] Assignee: The United States of America as represented by the Secretary of the Navy, Washington, D.C.

[21] Appl. No.: 304,417

[22] Filed: Sep. 9, 1981

[51] Int. Cl.⁶ .................................................. G01S 3/80
[52] U.S. Cl. .................................... 367/106; 367/130
[58] Field of Search ............................ 367/20, 21, 106, 367/130, 154, 901

[56] References Cited

U.S. PATENT DOCUMENTS 3,860,899   1/1975   Watlington et al. ............ 367/130

Primary Examiner—Daniel T. Pihulic
Attorney, Agent, or Firm—Thomas E. McDonnell

[57] ABSTRACT

Method and apparatus are disclosed for reducing breathing-wave induced noise in a liquid-filled elongate hose housing a hydrophone array. The arrangement involves sensing radial strain induced in the hose wall by the breathing waves (created as the hose is drawn longitudinally through water) and subtracting a multiple of the sensed value thereof from the array hydrophone output. Arrangements for measuring the breathing-wave-induced wall strains include (1) relative phase shifts in light passing through the sensing arm of an optical fiber interferometer, and (2) signal currents generated from piezoelectric polymer both of which are disposed inside the hose wall surrounding a hydrophone.

9 Claims, 1 Drawing Sheet

TOWED-ARRAY HOSE

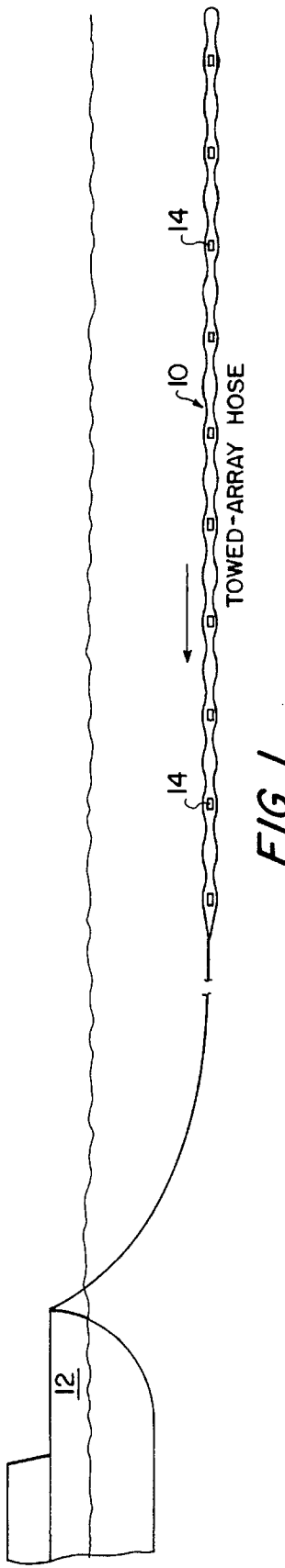
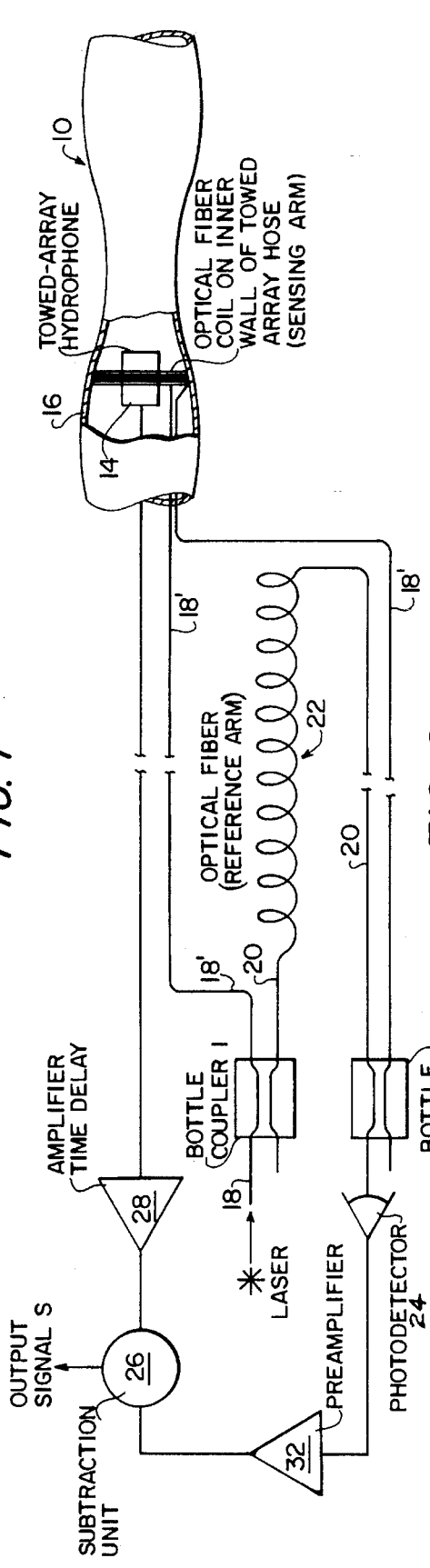
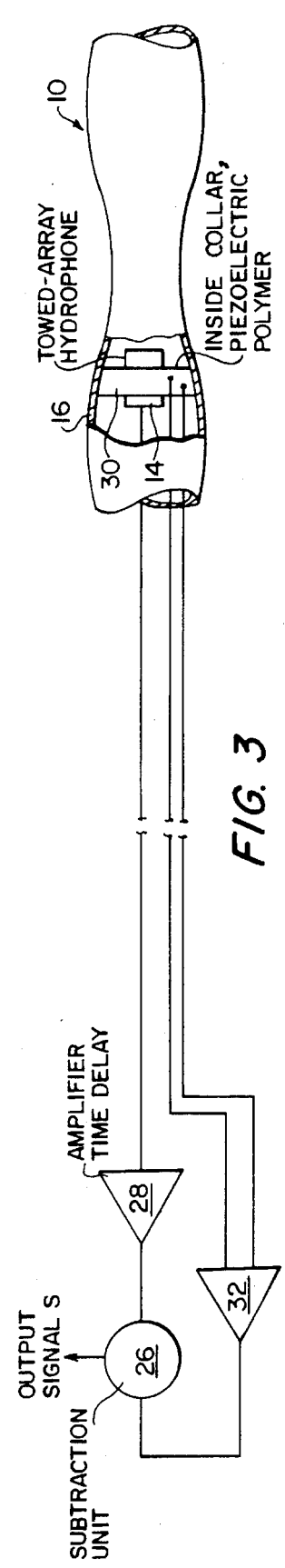

TOWED ARRAY STRAIN-SENSING NOISE CANCELLER

BACKGROUND OF THE INVENTION

When a liquid hose containing an array of hydrophones arrays is towed longitudinally through water there is created in the wall of the hose traveling or proprogating waves or undulations known as breathing waves. These waves are essentially minute axisymmetric radial deformations in the hose wall which propagate therealong progressively past each transducer in turn and interfere with transducer output. These breathing waves are generated by a number of conditions including excitation imposed by the turbuluent boundary layer, and their numbers and frequencies are related to tow speeds as well as to the geometry and condition of the array.

These breathing waves act to pulse-pressurize the liquid filling which surrounds each hydrophone. It is desirable that the hydrophones provide an output signal responsive to a distant exterior sound source without interference (noise) from local hydrostatic pressure pulse such as are caused by the breathing waves. The signal to noise ratio of an array hydrophone can therefore be increased by measuring the circumferential strain in the hose wall and subtracting a mulitple of the resulting signal from the total hydrophone output, thereby leaving a signal responsive only to distant sound or acoustic waves.

Cable strumming has long been recognized as a noise problem for towed hydrophones. It is a source of noise developed by transverse vibration of a cable upon being drawn through water, and it is a source of serious noise interference with acoustic input into a hydrophone. The cable's transverse vibrations cause axial accelerations decelerations at its free end where it is attached to a hydrophone housing. This results in a pulsating axial motion introduced into the housing which in turn is transferred to the hydrophone. U.S. Pat. No. 3,860,899 (Watlington) recognized the cable-strum axial vibration problem and provides an arrangement for generating an electric signal proportional to the axial accelerations and decelerations which is introduced in opposition to the electric signals generated by the hydrophones. The Watlington arrangement employes a velocity device which is connected to to the tow cable to insure that it moves in axial unison (forward and backward) wit the cable strumming. The present invention is directed to a different problem, that of traveling breathing waves. The problem is not recognized or treated in Watlington.

SUMMARY OF THE INVENTION

This invention relates to apparatus and method for sensing breathing waves propagating along a wall of a towed-array hose by detecting strain in the wall of the hose and generating a signal in response to the strain the effect of which is subtracted from the total output signal of a hydrophone, whereby only the true output signal remains.

Apparatus is provided inside the hose wall to sense breathing-wave-induced strain. In one embodiment this strain is sensed by a length of optical fiber which is secured to the inside wall of the hose to form a sensing arm of an interferometer. Light phase shifts therein are measured against light phase in another optical fiber forming a reference arm, which is isolated from the effect of the breathing waves, to generate a signal proportional to the strain. In another embodiment, the strain is sensed by a film of piezolectric polymer applied to the inner circumference of the hose wall. Strain induced in the piezoelectric polymer film by the flexure of the hose wall generates an electric signal proportional to the strain. In each embodiment, the effect of the signal produced from the breathing wave is subtracted from the total hydrophone output signal, with the net signal representing the true signal of the remote acoustic source only.

BRIEF DESCRIPTION OF THE DRAWINGS

FIG. 1 is a schematic representation of a considerable length of hose containing an array of hydrophones being towed under water by a surface ship.

FIG. 2 illustrates a section of the hose partially cut away and associated with an optical fiber and electronic schematic embodiments for breathing-wave detection and signal subtraction.

FIG. 3 also illustrates a section of the hose associated with a further schematic embodiment for detecting and subtracting breathing-wave signals.

DESCRIPTION OF THE PREFERRED EMBODIMENTS

Referring first to FIG. 1, there is illustrated a towed-array hose 10 (greatly enlarged) being towed through water by surface ship 12. The hose is liquid-filled and houses a plurality of hydrophones 14 longitudinally spaced apart along its extent, which may amount to many meters depending on its intended service. The primary purpose of the towed hose array is to detect remote acoustic sound sources. As the hose is towed through water there is introduced in its wall a series of surface undulations in the form of axisymmetric radial deformation (greatly exaggerated in FIG. 1) known as breathing waves. These waves propagate linearly along the extent of the hose and interfere with hydrophone reception. These waves can be generated by a number of mechanisms including direct excitation by the low wavenumber portion of the wall pressure spectrum imposed by the turbulent boundary layer, scattering of higher wave number components of the wall pressure spectrum at compliance discontinuities, and mechanical excitation in the axial coordinate.

As the hose wall flexes inwardly, it pressurizes the liquid in the hose in the vicinity, and this pressuration acts on the hydrophone to produce an electrical output signal. This is normally a low frequency output signal, but often adds to, interfers with, or even completly swamps a lesser signal that is desired to be detected from an acoustic source remote from the hose array.

There is disclosed in FIG. 2 one embodiment for optically detecting flexure in the hose wall and generating an electrical signal in response thereto the effect of which is subtracted from the total output signal of the hydrophone to remove the acoustic affect of the breathing waves. Light from a laser is launched into optical fiber 18. The light is split or divided by bottle coupler 1 into two equal beams propagating through optical fibers 18' and 20. Optical fiber 18' extends over a considerable length of the hose to the vicinity of hydrophone 14 where it is coiled about the inside wall 16 of the hose and secured thereto, as illustrated in FIG. 2, to define a sensing arm. Optical fiber 18' extends back to bottle coupler 2. Optical fiber 20, into which equal light was divided by bottle coupler 1, is substantially the same length as optical fiber 18', and may be formed into a coil to define a reference arm 22 which is isolated from acoustic pressure waves and flexure of hose wall 16. Optical fiber 20 extends back to bottle coupler 2 where it is optically coupled with fiber 18'. As wall 16 of the house undergoes undulations (flexure), it strains the optical fiber 18' wound therein to induce a length change which in turn causes a phase shift in light propagating therethrough when compared with the phase of light propagating through optical fiber 20. (reference arm). Light from optical fibers 18' and 20 is recombined at bottle coupler 2, and their combined output is detected by photodetector 24 and converted into an electrical signal. This signal is responsive to the strain induced in the coil length of optical fiber 18' by the breathing waves. The signal is amplified and fed to substracting unit 26. There it is subtracted from the signal generated by hydrophone 14 which is passed through amplifier time delay 28 and also fed on to subtraction unit 26. Output signal S represents the net signal produced when the breathing wave signals are subtracted from the total hydrophone output. By this arrangement relatively low-frequency noise is eliminated from a true source to be detected.

FIG. 3 discloses an alternate embodiment for subtracting the low-frequency noise signals from the true acoustic source signal. There is provided in this arrangement a strip of piezoelectric polymer film 30 disposed about and secured to the inner wall of the hose. Flexure of hose wall 16 strains the piezoelectric material which generates a current at its electrodes. Hydrophone 14 generates a signal in response to acoustic pressure waves thereon, as described in regard to the FIG. 2 embodiment. Unfortunately, this generated signal represents both the acoustic pressure waves on the hydrophone from the source being detected and the liquid pressurization caused by the breathing waves. This compound signal from the hydrophone is fed through ampifer time delay 28 to subtraction unit 26 as previously described in regard to the FIG. 2 embodiment. The electric output from piezoelectric polymer film 30 is fed through amplifier 32 to subtraction unit 26 where it is subtracted from the compound hydrophone output to provide a net output signal S.

In either embodiment advantages is taken of the breathing-wave induced flexure in the hose wall to generate an output signal, a multiple of which is subtracted from the total hydrophone output signal (source and breathing-wave pressures) to provide a net output signal substantially representing only the remote acoustic source waves.

Description has been directed to means for sensing hose wall flexure at a position generally radially surrounding a single hydrophone. It will be readily apparent that such an arrangement would be provided in the hose will opposite each hydrophone in an array. Laser light from a single or multiple source can be employed for launching light into respective optical fibers in the arrangement illustrated in FIG. 2. Likewise, single or multiple subtracting units may be employed.

It will be appreciated that the present invention provides an arrangement for substantially minimizing signals due to breathing waves ever present in the wall of a towed-array hose.

When the pressure at an interior hydrophone due to the breathing waves is equal to that from an external acoustic source, the circumferential strain in the hose wall due to the breathing waves is about three orders of magnitude larger than that due to the external acoustic source. Because of this large difference in strain, the circumferential strain measurement (as detected by the optical fiber sensing arm or by the piezoelectric polymer collar) can be used to minimize the hydrophone sensitivity to breathing waves without also adversely affecting its sensitivity to the external acoustic source.

Two arrangements have been disclosed for processing the signals. Other arrangements and variations may be employed to accomplish the same result, covered by the claims herein.

While the invention has been particularly shown and described with reference to specific embodiments, it will be understood by those skilled in the art that various changes in form and details may be made therein without departing from the spirit and scope of the invention which is limited only by the scope of the claims annexed hereto.

What is claimed is:

1. In an elongate liquid-filled hose housing a plurality of spaced-apart hydrophones defining a towed array which, when towed through water, has induced in its will from boundary layer contact low frequency longitudinally propagating axisymmetric radial deformations known as breathing waves which pressure-pulse radially inward on the liquid filling and interfere with hydrophone reception of acoustic sound waves emanating from a source outside the hose, the improvement comprising:

means including a part secured annularly about the inside of the hose wall at locations radially opposite respective hydrophones for generating a low frequency signal in response to the propagating breathing-wave-induced deformations in the wall which pressure-pulse the liquid about the hydrophone; and, means for processing the low frequency generated signal and substracting its effect from the output signal from respective hydrophones;

whereby noise from low frequency breathing waves is substantially eliminated.

2. The invention according to claim 1 wherein the part secured about the inside of the hose wall comprises:

piezoelectric polymer film for generating an electric signal in response to flexure of the hose wall.

3. The invention according to claim 1 wherein the part secured about the inside of the hose wall comprises:

a length of optical fiber wrapped therein defining the sensing arm of a two arm optical fiber interferometer;

wherein breathing-wave flexure of the wall induces a phase shift in light passing through the sensing arm relative to light phase passing through a length of optical fiber defining a reference arm which is isolated from the breathing-wave flexure.

4. The invention according to claim 3 wherein the length of optical fiber is helically wrapped about and secured to the inside wall of the hose.

5. The invention according to claim 1, wherein the means for processing the signal includes a substracting unit which subtracts the low frequency breathing-wave-induced signals from the hydrophone total output signal to provide a net output signal representing substantially only the hydrophone output induced by remote source acoustic sound waves.

6. The invention according to claim 2, wherein the means for processing the signal includes a subtracting unit which subtracts the low frequency breathing-wave-induced signals from the hydrophone total output signal to provide a net output signal representing substantially only the hydrophone output induced by remote source acoustic sound waves.

7. A method of reducing breathing-wave noise in an elongate liquid-filled hose housing a towed array of hydrophones and which, when towed through water, has induced in its wall from boundary layer contact low-frequency axisymmetric radial deformations propagating there along which pressure-pulse the liquid filling and interfere with hydrophone reception of acoustic sound waves emanating from a source outside the hose comprising the steps of:

generating a first signal responsive to both acoustic pressure waves from outside the hose and breathing waves in the hose wall;

generating a second signal responsive to the propagating breathing-wave-induced axisymmetric radial deformations in the hose wall; and, subtracting the effect of the second signal from the first signal to provide a net output signal which substantially represents only the magnitude of acoustic pressure waves emanating from outside the hose.

8. The method according to claim 7, further defined by generating the first signal from pressure waves reaching the hydrophone through the liquid filling.

9. The invention according to claim 6, further defined by the processing means comprising:

amplifier time delay means for processing the hydrophone output signals; and, amplifier means for processing the piezoelectric polymer output signals.

\* \* \* \* \*